United States Patent Office
3,278,476
Patented Oct. 11, 1966

3,278,476
TREATMENT OF GLASS SURFACES WITH POLYMERS OF ALKALI METAL VINYL SILICONATES
Thomas R. Santelli, Toledo, Ohio, assignor to Owens-Illinois Glass Company, a corporation of Ohio
No Drawing. Filed July 25, 1961, Ser. No. 126,500
14 Claims. (Cl. 260—29.6)

This invention relates to forming a lubricious and water-repellent surface on articles and particularly on siliceous articles such as glass articles, e.g., glass containers and glass fibers and to the resultant articles. In another aspect, the invention relates to aqueous solutions of polymers and to a method for their production.

In certain uses of articles such as glass containers and glass fibers, it is desirable to provide a water-repellent surface on the articles. Heretofore, such surfaces have been formed by applying emulsions or organic solvents. In addition, water-repellent surfaces have been provided from sodium vinyl siliconate in an aqueous solution by first treating the solution with acid or in an ion exchange tower to neutralize or deionize the solution. Attempts have also been made to neutralize the solution after it has been applied to the glass article. Attempts to apply a water-repellent coating from an aqueous solution without neutralizing have heretofore proved relatively unsuccessful.

It is an object of this invention to provide a durable, lubricious and water-repellent polymeric coating on articles, a method for producing the solution used to form the coating on the articles and a method for producing the resultant coating on the glass article.

It is a further object of the invention to provide an article having a novel water-repellent surface coating.

A further object of the invention is to provide new polymer solutions and a method for producing same.

Other objects, as well as aspects and advantages, of the invention will become apparent from a study of the following specification.

A prior art method of producing a water-repellent coating on surfaces, particularly glass fibers, is known wherein an alkyl chlorosilane is hydrolyzed by adding it to ice water, and the resulting polysiloxane dissolved in a base such as a sodium hydroxide solution. The resulting alkaline solution of a siliconate cannot be neutralized without precipitating polysiloxane. The siliconate solutions can be partially neutralized and applied to the surface of glass fibers, but the water repellency is relatively poor unless the coated material is washed repeatedly with water or is exposed to a neutralizing atmosphere of carbon dioxide. Such a procedure is tedious and expensive and causes the loss of some of the coating. According to the present process, an alkaline solution of my treating agent gives excellent water repellency without removal of caustic by washing or neutralization.

Another known method of obtaining a neutralized polysiloxane coating on glass or glass fibers is set forth in British Patent 746,037. This method involves the reaction of a halosilane, such as vinyltrichlorosilane with an alcohol such as ethyl alcohol to obtain an organic trialkoxysilane such as vinyltriethoxysilane. Thereafter, the vinyltriethoxysilane is hydrolyzed with aqueous sodium hydroxide to sodium vinyl siliconate. This siliconate solution is then treated with the hydrogen form of a cation exchanger to produce an organic silanol, in this instance, vinyl silanol. Thus, the silanol solution is obtained substantially free from sodium or other ions present from the hydrolyzing step. When the glass or glass fibers are treated with the silanol solution and then dried, condensation of the silanol takes place to form an insoluble, water-repellent silicone of good repellency. Of course, this method contains an extra treating step involving employment of the expensive ion exchange resins.

I have now found another and superior method of obtaining a lubricious and water-repellent coating on surfaces, particularly surfaces of glass articles, starting from a vinyl polymer of a vinyltrialkoxysilane. In the present method a superior coating is obtained which contains a hydrocarbon backbone derived from the polymerized vinyl groups. In the present method a vinyl trialkoxy silane,

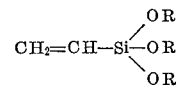

wherein each R is selected from methyl, ethyl and propyl, is polymerized by addition polymerization through the vinyl group, the poly(vinyltrialkoxysilane) is hydrolyzed in an aqueous alkali metal hydroxide solution. The resulting poly(vinyl alkali metal siliconate) is soluble in basic water solutions. Such solutions can be applied to glass surfaces and then dried to form a lubricious, water-repellent, durable coating. On drying the silanol groups resulting from the previous hydrolysis condense to form polysiloxane linkages, in addition to the hydrocarbon linkages previously formed by polymerization of the vinyl groups. The tenacity of the bond to the glass is believed to be attributable to a portion of the —OH groups reacting with the glass surface.

The vinyl polymerization is not per se part of the invention, and can be effected by any suitable method. For example, polymerization is easily effected by bulk polymerization at temperatures of about 100–160° C. using 2–8 weight percent of an organic peroxy compound, such as ditertiarybutylperoxide.

The poly(vinyltrialkoxysilane) can be hydrolyzed by mixing with a basic solution to form a solution of the hydrolyzate in the base, so long as the pH is maintained high enough to prevent condensation and gelation. A pH of about 9–10.5 is marginal since the stability is poor and a pH of about 11 or higher gives stable solutions of the poly(vinyl alkali metal siliconate).

Since the foregoing method of hydrolysis is somewhat slow because the unhydrolyzed polymer is not soluble in the caustic, another useful method of effecting the hydrolysis is to dissolve the unhydrolyzed polymer in alcohol and then hydrolyze with aqueous base. Surprisingly, the hydrolyzate is not soluble in alcohol and it thus precipitates. However, if the precipitate is separated from the supernatant liquid, or the bulk thereof, the hydrolyzate will redissolve in an aqueous alkali metal hydroxide solution, to form a basic aqueous solution of a siliconate of an alkali metal, i.e., a basic solution of poly(vinyl alkali metal siliconate).

This solution can be employed to treat siliceous surfaces such as glass surfaces, usually after dilution to a concentration of from 0.05 to 5 weight percent of the vinyl polymer, calculated as poly(vinylsilanol), having the general formula:

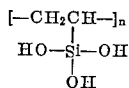

where $n$ is an integer of 2 or more. This solution can be applied to glass surfaces and dried without neutralization or removal of metal ions. The article with the coating, applied by dipping, spraying, brushing or the like, is heated to a suitable temperature to remove water and provide the water-repellent and lubricious coating, usually at a temperature of about 100–350° F., but more often in the range from 120–160° F. Times of heating are generally from 10 seconds to 30 minutes, the longer times being employed with the lower temperatures, and vice versa. During this step condensation to form siloxane linkages takes place.

The resulting coating is invisible and has a thickness of 1 or 2 Angstroms. Of course, thicker coatings are possible by using multiple treatments or by using more concentrated solutions, if desired. The coating is of very highly water-repellent, on the order of ducks' back quality. In addition, it is extremely tenacious and durable. For example, the coating is not removed after boiling in hot water. The tenacity of the bond to glass surfaces is undoubtedly due to a portion of the —OH groups reacting with the glass surface.

As stated, the invention is practiced using an alkali metal (sodium, potassium, lithium, rubidium, cesium) hydroxide as the base. However, the invention is usually practiced with sodium hydroxide because of its relative availability and low cost.

In a specific example of the invention, practical vinyltriethoxysilane was redistilled to obtain the pure vinyltriethoxysilane, water-white, boiling at 152–154° C. To 400 ml. of this monomer was added 4 gms. of ditertiarybutylperoxide, and the mixture was slowly heated, with stirring, over a period of about 1 hour to a temperature of about 135° C., at which time a vigorous exothermic reaction occurred and the viscosity suddenly increased. This elevated temperature was held for a few minutes and the reaction mixture was cooled. The poly(vinyltriethoxysilane) product was a very viscous liquid at room temperature, and infrared analysis showed an absence of vinyl groups, indicating substantially 100% conversion by polymerization through the vinyl groups.

The polymer was soluble in most organic solvents, such as acetone, ethanol, etc., but was insoluble in water. A solution of 96 gms. of the polymer in 46 gms. of ethanol was made up, and this was added slowly to a solution of 20 gms. of NaOH in 100 ml. of water. Hydrolysis was effected and an opaque mixture formed almost immediately. This rapidly produced a mass of white precipitate. Total reaction time was 20 minutes, during which the temperature rose from 30° C. to 47° C. The mother liquor was decanted from the precipitate. This product is insoluble in most organic solvents such as acetone and ethanol, but dissolves in water to give a very basic solution. This is the poly(vinyl sodium siliconate) solution of the invention. It was diluted to about a 4 weight percent aqueous solution. Glass slides were dipped in this solution and then dried at 50° C. for 20 hours. The treated portions showed good water-repellent properties compared to the untreated portions, and were lubricious and durable. The slides weer placed for 1 hour in boiling 10% NaOH solution, rinsed with water and dried. The treated portions still retained their water-repellent and lubricious properties.

Similar results are obtained when starting with poly(vinyltrimethoxysilane) or poly(vinyltripropoxysilane), similarly prepared from the corresponding monomers.

The invention also contemplates rinsing base from the dried coating with water or acid solutions, where desired.

As will be evident to those skilled in the art, various modifications of this invention can be made or followed in the light of the foregoing disclosure and discussion without departing from the spirit and scope of the disclosure or from the scope of the claims.

I claim:
1. A method of coating the surface of a siliceous article to impart water-repellency which comprises contacting a surface of said article with an aqueous solution of a polymer of alkali metal vinyl siliconate, said polymer having been prepared by polymerizing a vinyltrialkoxy silane through the vinyl groups, and subsequently hydrolyzing said polymerized vinyltrialkoxysilane with alkali metal hydroxide, and drying said surface to form polysiloxane linkages.

2. A method of coating the surface of a siliceous article to impart water-repellency which comprises contacting a surface of said article with an aqueous alkaline solution of a polymer of alkali metal vinyl siliconate, said polymer having been prepared by polymerizing a vinyltrialkoxysilane through the vinyl groups, and subsequently hydrolyzing said polymerized vinyltrialkoxysilane with alkali metal hydroxide, and drying said surface to form polysiloxane linkages.

3. A method of coating the surface of a glass container to impart water-repellency which comprises contacting a surface of said container with an aqueous solution of a polymer of alkali metal vinyl siliconate, said polymer having been prepared by polymerizing a vinyltrialkoxysilane through the vinyl groups, and subsequently hydrolyzing said polymerized vinyltrialkoxysilane with alkali metal hydroxide, and drying said surface to form polysiloxane linkages.

4. A siliceous article having a water-repellent coating of a polymer of alkali metal vinyl siliconate containing polysiloxane linkages, said polymer having been prepared by polymerizing a vinyltrialkoxysilane through the vinyl groups, and subsequently hydrolyzing said polymerized vinyltrialkoxysilane with alkali metal hydroxide.

5. A siliceous article having a water-repellent coating of a polymer of alkali metal vinyl siliconate containing polysiloxane linkages, said polymer having been prepared by polymerizing a vinyltrialkoxysilane through the vinyl groups, and subsequently hydrolyzing said polymerized vinyltrialkoxysilane with alkali metal hydroxide.

6. A glass container having a water-repellent coating of a polymer of alkali metal vinyl siliconate containing polysiloxane linkages, said polymer having been prepared by polymerizing a vinyltrialkoxysilane through the vinyl groups, and subsequently hydrolyzing said polymerized vinyltrialkoxysilane with alkali metal hydroxide.

7. A method of coating the surface of a glass article to impart water-repellency which comprises contacting the surface of said article with an aqueous solution of a polymer of alkali metal vinyl siliconate, said polymer having been prepared by polymerizing a vinyltrialkoxysilane through the vinyl groups, and subsequently hydrolyzing said polymerized vinyltrialkoxysilane with alkali metal hydroxide, to form polysiloxane linkages.

8. A glass article having a water-repellent coating of a polymer of sodium vinyl siliconate containing polysiloxane linkages, said polymer having been prepared by polymerizing a vinyltrialkoxysilane through the vinyl groups, and subsequently hydrolyzing said polymerized vinyltrialkoxysilane with sodium hydroxide.

9. A method according to claim 2 wherein said aqueous solution contains said polymer in a concentration from 0.05 to 5 weight percent, calculated as poly(vinylsilanol).

10. An aqueous alkaline solution of a polymer of sodium vinyl siliconate, said polymer having been prepared by polymerizing a vinyltrialkoxysilane through the vinyl groups, and subsequently hydrolyzing said polymerized vinyltrialkoxysilane with sodium hydroxide.

11. A method for preparing an aqueous alkaline solution of a polymer of an alkali metal vinyl siliconate which comprises polymerizing through the vinyl groups a vinyltrialkoxysilane,

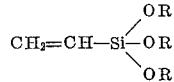

wherein each R is selected from the group consisting of methyl, ethyl and propyl, hydrolyzing said polymerized vinyltrialkoxysilane with alkali metal hydroxide and dissolving the polymer hydrolysate in water.

12. A method of claim 11 wherein the alkali metal is sodium.

13. The method as defined in claim 2 wherein said polymer is a homopolymer of alkali metal vinyl siliconate.

14. The siliceous article as defined in claim 5 wherein said polymer is a homopolymer of alkali metal vinyl siliconate.

References Cited by the Examiner
UNITED STATES PATENTS

| 2,683,097 | 7/1954 | Biefeld | 117—126 |
| 3,081,195 | 3/1963 | Biefeld | 117—126 |
| 3,177,170 | 4/1965 | Lund | 260—29.2 |

FOREIGN PATENTS 746,038   3/1956   Great Britain.

OTHER REFERENCES

Meals et al.: Silicones, Reinhold Publishing Co., New York, 1959 (page 213).

MURRAY TILLMAN, *Primary Examiner.*

WILLIAM H. SHORT, *Examiner.*

K. CLARKE, N. F. OBLON, *Assistant Examiners.*